United States Patent [19]

Baxter et al.

[11] Patent Number: 5,259,188
[45] Date of Patent: Nov. 9, 1993

[54] METHOD AND SYSTEM TO INCREASE STALL MARGIN

[75] Inventors: Thomas A. Baxter, Woburn; Murray L. Dubin, Peabody; James A. Huffman, Topsfield; Dominic Stasio, Wakefield, all of Mass.

[73] Assignee: General Electric Company, Cincinnati, Ohio

[21] Appl. No.: 934,603

[22] Filed: Aug. 24, 1992

[51] Int. Cl.$^5$ .............................................. F02K 1/16
[52] U.S. Cl. ...................................... 60/204; 60/239; 60/39.29
[58] Field of Search ............... 60/204, 237, 239, 242, 60/39.29, 39.281

[56] References Cited

U.S. PATENT DOCUMENTS

| | | | |
|---|---|---|---|
| 2,941,354 | 6/1960 | Sobey | 60/239 |
| 4,164,033 | 8/1979 | Glennon | 60/39.29 |
| 4,756,152 | 7/1988 | Krukoski et al. | 60/39.29 |
| 5,029,441 | 7/1991 | Parsons | 60/39.281 |

OTHER PUBLICATIONS

General Electric Company, "F404 Training Guide," Jul. 1982, pp. cover, Intro., 1-1 to -5, 1-19, 1-20, FIGS. 1-4, -6, -7, & -14, 5-1 to -3, 7-1 to -7, FIG. 7-1 to -9.

*Primary Examiner*—Louis J. Casaregola
*Attorney, Agent, or Firm*—Jerome C. Squillaro; Bernard E. Shay

[57] ABSTRACT

A method and system are provided to bias a control subsystem of a gas turbine engine having a fan and compressor. The method includes the steps of measuring an operating parameter of the engine and differentiating this parameter over time to obtain a derivative thereof. A bias signal is generated in a predetermined bias schedule in response to the parameter derivative, and provided to the control subsystem for biasing the subsystem. The bias signal has a zero value for values of the parameter derivative from zero to a first value thereof at a first time. The bias signal has a maximum value for values of the parameter derivative between second and third values thereof corresponding with second and third times. And, the bias signal returns to a value of zero after a fourth time greater than the third time. In an exemplary embodiment, the operating parameter is fan speed, and the bias signal is provided to at least one, and preferably both, control subsystems of variable guide vanes regulating flow to the fan and a variable area exhaust nozzle regulating discharge flow area.

10 Claims, 4 Drawing Sheets

METHOD AND SYSTEM TO INCREASE STALL MARGIN

The present invention relates generally to aircraft gas turbine engines, and, more specifically, to a control system and method for increasing fan stall margin during deceleration.

BACKGROUND OF THE INVENTION

An exemplary turbofan gas turbine engine for powering an aircraft includes in serial flow communication a fan, a compressor, a combustor, a high pressure turbine (HPT) which powers the compressor, a low pressure turbine (LPT) which powers the fan, an afterburner, and a variable area exhaust nozzle (VEN). The fan includes a plurality of circumferentially spaced apart fan blades extending radially outwardly from a rotor which are effective for compressing air received by the engine during operation. The fan has a conventional performance map indicating its ability to provide pressure increase of the inlet airflow during various operations of the engine while maintaining a suitable stall margin. Stall margin is a conventional parameter for ensuring the prevention of fan stall as the engine is operated in a conventional flight envelope of the aircraft being powered by the engine.

The engine further includes a conventional control system including several subsystems thereof which control the various components of the engine. For example, a VEN control subsystem controls actuators which in turn control the discharge flow area of the VEN as thrust generated by the exhaust gases discharged therefrom is varied. The area of the VEN is conventionally selectively opened, or increased, and closed, or decreased, as required during operation. This is typically done by providing within the overall engine control system a predetermined VEN schedule which provides a suitable area demand signal to the VEN control subsystem for suitably positioning the VEN.

This exemplary engine also includes conventional variable guide vanes (VGVs) associated with the fan for selectively controlling the inlet airflow therethrough. A VGV control subsystem conventionally controls the angular position of the vanes between open and closed positions thereof which provide predetermined maximum and minimum, respectively, flow area through the vanes for regulating the inlet airflow to the fan. The engine control system additionally includes a predetermined VGV schedule to control the opening and closing of the VGVs during operation of the engine.

It is conventionally known to vary the position of the VGVs and the area of the VEN, among other parameters, to control stall margin of the fan. However, in a derivative engine being developed, the fan performance map includes a pinch point region wherein the stall margin decreases to less than the desired value thereof during operation of the engine over the portion of the flight envelope and in a transient condition known as throttle chop during which the fan abruptly decelerates. Accordingly, it is desired to increase the fan stall margin to reduce the pinch point region while using the conventional structures of the engine to minimize required hardware changes.

SUMMARY OF THE INVENTION

A method and system are provided to bias a control subsystem of a gas turbine engine having a fan and compressor. The method includes the steps of measuring an operating parameter of the engine and differentiating this parameter over time to obtain a derivative thereof. A bias signal is generated in a predetermined bias schedule in response to the parameter derivative, and provided to the control subsystem for biasing the subsystem. The bias signal has a zero value for values of the parameter derivative from zero to a first value thereof at a first time. The bias signal has a maximum value for values of the parameter derivative between second and third values thereof corresponding with second and third times. And, the bias signal returns to a value of zero after a fourth time greater than the third time. In an exemplary embodiment, the operating parameter is fan speed, and the bias signal is provided to at least one, and preferably both, control subsystems of variable guide vanes regulating flow to the fan and a variable area exhaust nozzle regulating discharge flow area.

BRIEF DESCRIPTION OF THE DRAWING

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
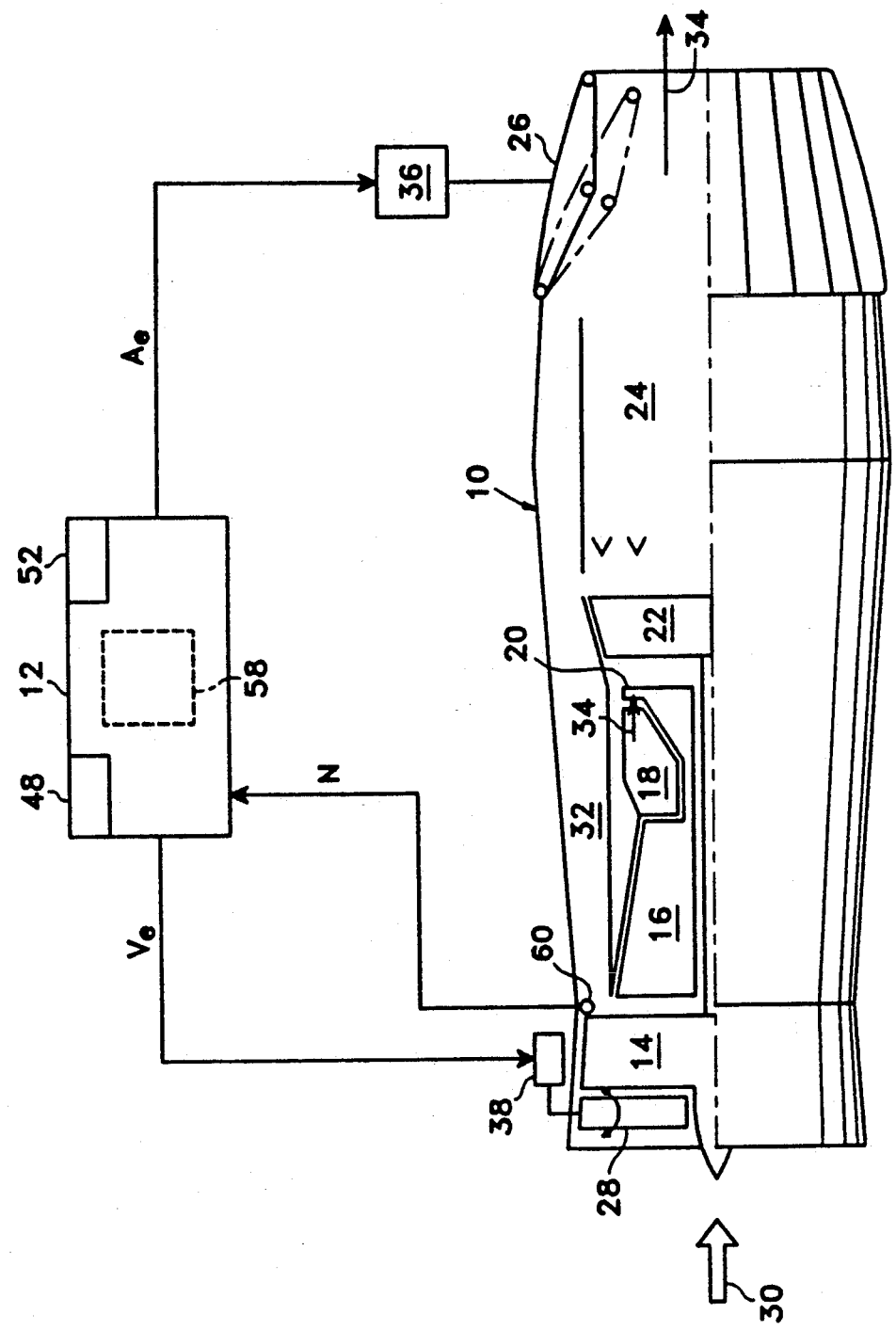
FIG. 1 is a schematic representation of an exemplary augmented, turbofan gas turbine engine for powering an aircraft in flight having a control system in accordance with one embodiment of the present invention.

Illustrated schematically in FIG. 1 is an exemplary augmented, turbofan gas turbine engine 10 having a controller 12 in accordance with one embodiment of the present invention. The engine 10 conventionally includes in serial flow communication a fan or low pressure compressor 14, a high pressure compressor (HPC) 16, a combustor 18, a high pressure turbine (HPT) 20, a low pressure turbine (LPT) 22, an afterburner or augmenter 24, and a variable area exhaust nozzle (VEN) 26. The fan 14 is powered by the LPT 22 through a shaft extending therebetween, and the HPC 16 is powered by the HPT 20 by another shaft extending therebetween.

The engine 10 further includes conventional variable guide vanes (VGVs) 28 which are disposed upstream of the fan 14 for regulating therethrough ambient airflow 30 received thereby. An outer portion of the airflow 30 bypasses the compressor 16 through an annular bypass duct 32, and an inner portion of the airflow 30 is channeled through the compressor 16 wherein it is further compressed and discharged to the combustor 18, mixed therein with fuel and ignited for generating combustion or exhaust gases 34 which are channeled through the HPT 20 and the LPT 22 for powering the compressor 16 and the fan 14, respectively. The exhaust gases 34 then flow through the afterburner 24 and are discharged from the engine 10 through the VEN 26 for generating thrust for powering the aircraft.

In dry operation of the engine 10, the exhaust gases 34 simply flow through the afterburner 24 without additional energy added thereto. In wet operation of the engine 10, additional fuel is mixed with the exhaust gases 34 and ignited in the afterburner 24 in a conventional manner for increasing the thrust therefrom. The exhaust flow area of the VEN 26 is selectively varied by selectively repositioning the VEN 26 by a conventional actuator system, or simply actuator 36. The controller 12, which may include a conventional actuator system, or simply actuator 36. The controller 12, which may include a conventional digital electronic control (DEC) in the preferred embodiment, receives various conventional inputs from the engine 10 for controlling its various functions such as fuel flow to the combustor 18 and to the afterburner 24 and for controlling the VEN 26 and VGVs 28, for example.

The VGVs 28 are similarly controlled by the controller 12 through a conventional VGV actuator system, or simply actuator 38 which is effective for rotating the VGVs 28 about their radial axes between conventional fully opened and fully closed positions corresponding to maximum and minimum flow areas therethrough.

Figure 2:
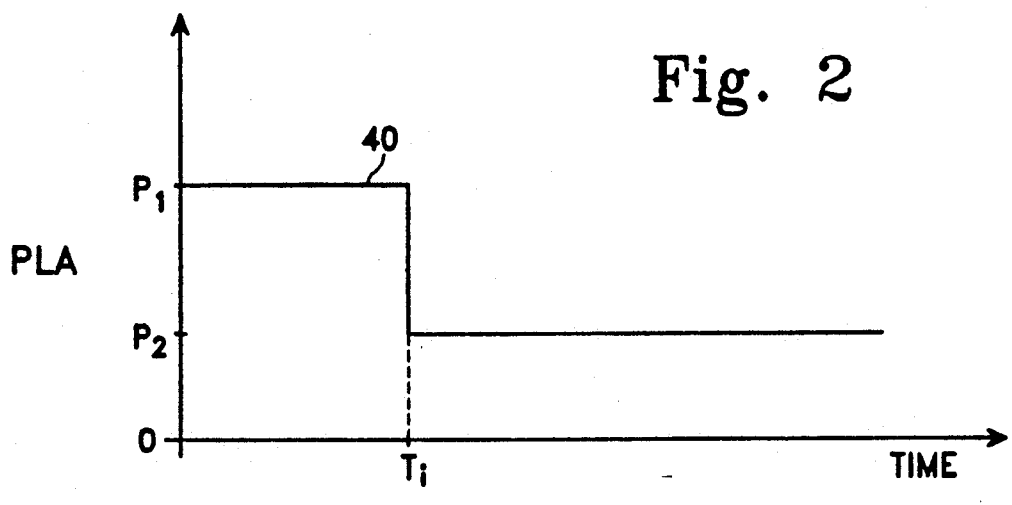
FIG. 2 is a graph plotting engine throttle position (PLA) versus time in an exemplary throttle chop for the engine illustrated in FIG. 1.
Figure 3:
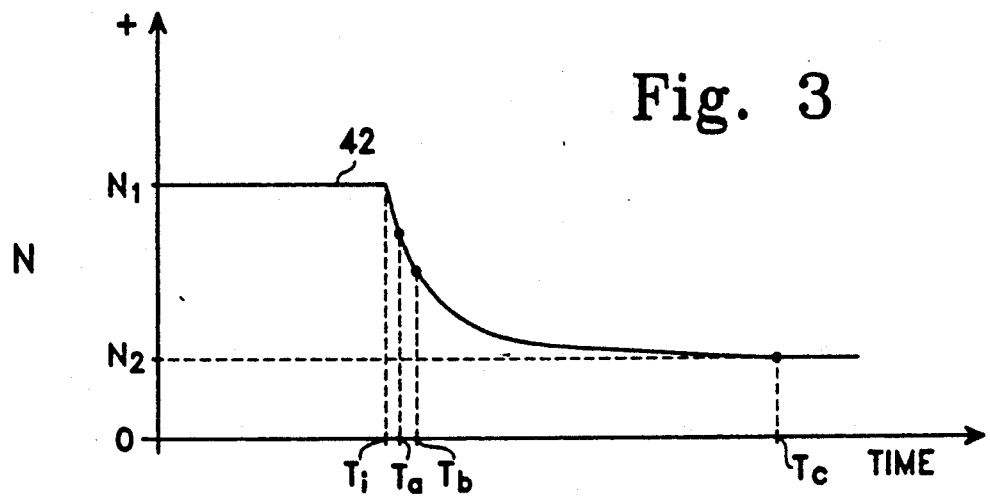
FIG. 3 is a graph plotting fan speed (N) versus time which occurs due to the throttle chop illustrated in FIG. 2.

Illustrated in FIG. 2 is a graph plotting throttle position or power lever angle (PLA) versus time for the engine 10 illustrated in FIG. 1 for an exemplary throttle chop operation of the engine 10. More specifically, FIG. 2 represents the engine 10 being operated at an initial throttle setting of $P_1$ at a relatively high thrust output level near the maximum dry rated power, conventionally known as Military Power or IRP. And, at an initiation time $T_i$ the throttle is chopped to a lower thrust setting of $P_2$ and remains at that level for an indefinite time as desired. The resulting PLA-curve 40 is, therefore, effectively in the form of a step function. The throttle chop illustrated in FIG. 2 will then cause power output from the engine 10 to decrease with a sudden deceleration of the fan 14 as illustrated in FIG. 3. Fan rotational speed is designated N and is plotted in FIG. 3 as the N-curve 42. At the first throttle setting $P_1$, the fan 14 is rotating at a specific rotational speed $N_1$, which, upon the throttle chop at the initiation time $T_i$, causes the fan speed N to drop in magnitude exponentially over time down to a second, lower speed $N_2$ as shown by the exemplary fan speed N-curve 42.

Figure 4:
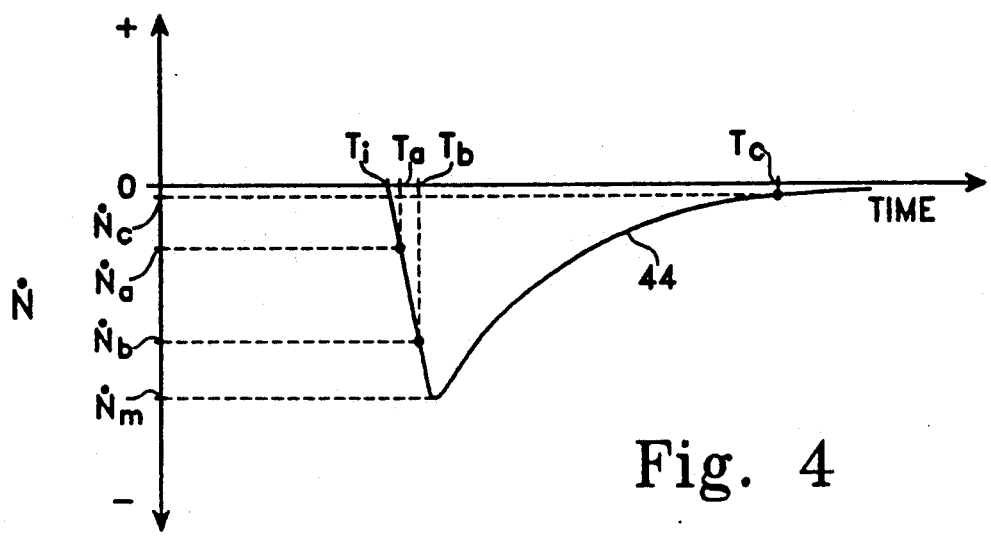
FIG. 4 is a graph plotting the derivative of fan speed with respect to time (Ṅ) versus time showing fan deceleration corresponding to the reduction in fan speed illustrated in FIG. 3.

The rate of change over time, or derivative, of the fan speed N is represented mathematically by $dN/dt$ or $\dot{N}$ which is plotted in FIG. 4 as the fan speed derivative $\dot{N}$-curve 44 corresponding to the N-curve 42 illustrated in FIG. 3 and the PLA-curve 40 illustrated in FIG. 2. At the initiation time $T_i$, the fan speed N decelerates with an initially increasing negative value of acceleration until it reaches a maximum deceleration $\dot{N}_m$ after which time the rate of speed change $\dot{N}$ becomes less negative as it approaches the zero value of acceleration over time to resume steady state operation at the second throttle setting $P_2$. The transient operation of the engine 10 associated with the throttle chop and the decreasing fan speed N from the first value $N_1$ to the second $N_2$ requires suitable control of the engine 10 for maintaining an adequate stall margin for the fan 14.

Figure 5:
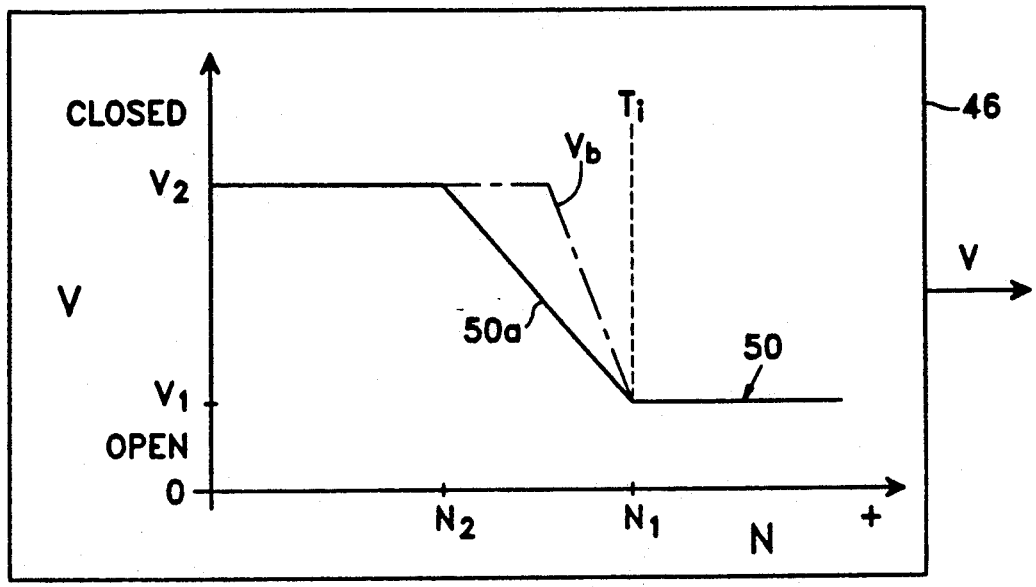
FIG. 5 is a vane schedule in the form of a graph plotting angular position (V) of variable guide vanes of the engine illustrated in FIG. 1 versus the fan speed (N) following the throttle chop illustrated in FIG. 2.

More specifically, the controller 12 illustrated in FIG. 1 includes a conventional, predetermined vane schedule indicated schematically by the box labeled 46 in FIG. 5 which is part of a conventional closed-loop vane (VGV) control subsystem 48 of the controller 12 also illustrated schematically in FIG. 1. The vane control subsystem 48 is conventionally effective for providing a vane position error signal $V_e$ through a suitable electrical lead to the VGV actuator 38 for selectively opening and closing the VGVs 28 by rotation thereof to a vane position V for increasing and decreasing, respectively, the inlet airflow 30 through the fan 14 in accordance with the vane schedule 46. For example, the vane schedule 46 in FIG. 5 includes an exemplary and conventional vane position curve, i.e. V-curve, 50 shown in solid line indicating the degree of openness of the VGVs 28 from a first open position $V_1$ associated with the first throttle setting $P_1$ of FIG. 2 and with the high speed $N_1$ of FIG. 3 up until the initiation time $T_i$ after which time the VGVs 28 are progressively closed to a relatively closed second position $V_2$ associated with the second throttle setting $P_2$ and with the lower speed $N_2$ of FIG. 3. A suitable transition ramp designated 50a is provided in the V-curve 50 between the first and second values $V_1$ and $V_2$ thereof and is predeterminedly for providing a predetermined stall margin in the operating map of the fan 14 during the throttle chop illustrated in FIG. 2. The output of the vane schedule 46 is the desired vane position in the form of a signal designated V.

Figure 6:
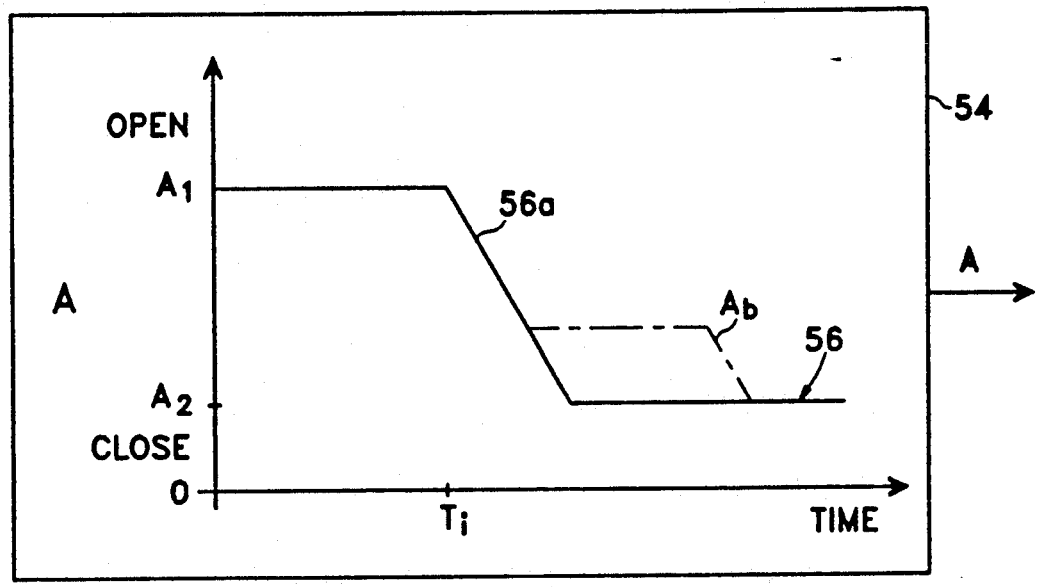
FIG. 6 is an area schedule in the form of a graph plotting area (A) of a variable area exhaust nozzle of the engine illustrated in FIG. 1 versus time following the throttle chop illustrated in FIG. 2.

Similarly, FIG. 1 also schematically illustrates a conventional closed-loop VEN control subsystem 52 for providing an area error signal $A_e$ through a suitable electrical lead to the VEN actuator 36 for selectively opening and closing the VEN 26 for increasing and decreasing, respectively, the discharge flow area A thereof in accordance with a predetermined VEN schedule 54 as illustrated in FIG. 6. The VEN schedule 54 includes a discharge flow area curve, i.e., A-curve 56 shown in solid line associated with the PLA-curve 40 shown in FIG. 2, with the VEN discharge flow area A, throat area for example, decreasing from a first open position value $A_1$ associated with the initial throttle setting $P_1$ to a relatively closed second position $A_2$ associated with the lower setting $P_2$, with a suitable transition ramp 56a therebetween. The discharge flow area A-curve 56 is also preselected for maintaining a predetermined stall margin of the fan 14 during the throttle chop illustrated in FIG. 2. The output of the VEN schedule 54 is the desired VEN area in the form of a signal designated A.

However, in order to increase the performance capability of the engine 10, it has been determined that a reduction, or pinch point region in stall margin of the performance map of the fan 14 will occur notwithstanding the pre-existing V-curve 50 in the vane schedule 46 and the A-curve 56 in the VEN schedule 54 which were originally designed for a parent engine.

In accordance with one embodiment of the present invention, a control system 58 is incorporated in the controller 12 illustrated in FIG. 1 for increasing stall margin of the fan 14 while utilizing existing components and control subsystems without appreciable changes thereto. The control system 58 also provides an improved method of biasing at least one, and preferably both, of the control subsystems 48 and 52 in an exemplary preferred embodiment. More specifically, FIG. 1 illustrates a conventional fan speed sensor 60 operatively connected to the controller 12 by a suitable electrical lead for measuring the fan speed N and providing a signal indicative thereof to the control system 58 within the controller 12. The fan speed N is an exemplary operating parameter of the gas turbine engine 10 which is used in the preferred embodiment of the invention. However, other operating parameters may also be used as described below.

Figure 7:
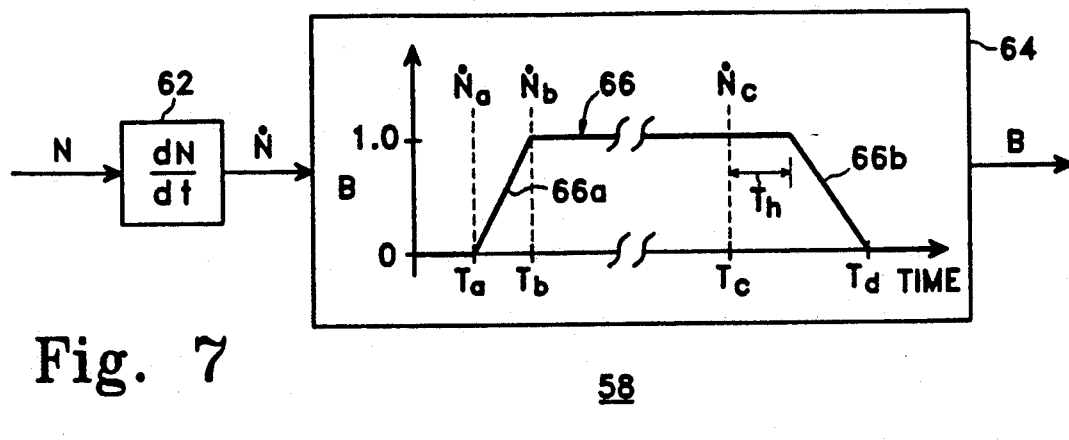
FIG. 7 is a schematic representation of a control system in accordance with one embodiment of the present invention for biasing control subsystems of the engine illustrated in FIG. 1 for increasing fan stall margin.

The control system 58 is illustrated schematically in FIG. 7 wherein the fan speed N from the sensor 60 is provided to a conventional differentiator 62 for differentiating the fan speed N over time to obtain a first derivative of the fan speed N indicative of rate of change, or acceleration, i.e., dN/dt or $\dot{N}$, of the fan speed N. The operating parameter derivative $\dot{N}$ is shown by the $\dot{N}$-curve 44 illustrated in FIG. 4 resulting from the throttle chop of FIG. 2 which leads to the decrease in rotor speed N illustrated in FIG. 3. A zero or near zero rate of change of the fan speed N indicates steady state operation, whereas a suitable non-zero rate of change of the fan speed N indicates transient operation.

The rate of change of the fan speed N is used in a predetermined bias schedule 64 illustrated in FIG. 7 for generating a bias signal B in response to $\dot{N}$, or fan speed parameter derivative, for biasing one or both of the control subsystems 48 and 52 for increasing stall margin of the fan 14 over that which would occur conventionally without the bias signal B. As shown in the bias schedule 64 illustrated in FIG. 7, the bias signal B preferably has a value of zero during steady state operation when biasing is not required for improving stall margin of the fan 14 which occurs for $\dot{N}$ values from zero up to a predetermined first value thereof $\dot{N}_a$ at a first time $T_a$.

Referring also to FIG. 4, it is noted that upon the throttle chop illustrated in FIG. 2, which starts at the initiation time $T_i$, the fan speed N illustrated in FIG. 3 decelerates quite abruptly with the maximum value of deceleration $\dot{N}_m$ occurring shortly thereafter. During steady state operation of the fan 14, the bias signal B has a zero value, and upon transient operation of the fan 14 in the fan deceleration mode, the bias signal B is preferably turned on or has a non-zero value at the first time $T_a$ associated with the predetermined first value $\dot{N}_a$ of the fan speed rate of change. The first value of the parameter derivative $\dot{N}_a$ has an absolute value greater than zero and less than the maximum value $\dot{N}_m$ and occurs between the initiation time $T_i$ and the time associated with the maximum value $\dot{N}_m$ as illustrated in FIG. 4. In this way, the beginning of the transient rotor deceleration is promptly identified based on deceleration in order to promptly initiate the bias signal B for improving fan stall margin. The particular magnitude of the parameter derivative first value $\dot{N}_a$ is preselected for each design application based on response characteristics of the engine 10 and the control subsystem, e.g. 48 and/or 52, being affected, and may be determined analytically and/or empirically. The specific magnitude of $\dot{N}_b$ is similarly selected for each design application based on performance of the engine 10 and control subsystems 48 and 52 for obtaining stable operation thereof while improving fan stall margin.

The bias signal B has a maximum value, for example 1.0 as shown in FIG. 7, for values of the fan speed rate of change between second and third values thereof, i.e. $\dot{N}_b$ and $\dot{N}_c$, respectively, which correspond with second and third times $T_b$ and $T_c$, with the second time $T_b$ being greater than, or after, the first time $T_a$, and the third time $T_c$ being greater than, or after, the second time $T_b$. In other words, the bias signal B remains on for as long as required during the transient fan deceleration event for allowing adequate time to effect stall margin increase as required for the transient throttle chop before removing the bias signal B. As shown in FIG. 7, the bias signal B-curve 66 increases from its zero value to its maximum (1.0) value over a finite time corresponding with the time interval $T_a$ to $T_b$. The introduction of the bias signal B could be a step function with substantially instantaneous increase from its zero value to its maximum value. However, in the preferred embodiment of the present invention, a progressively increasing introduction of the bias signal B is preferred.

Figure 8:
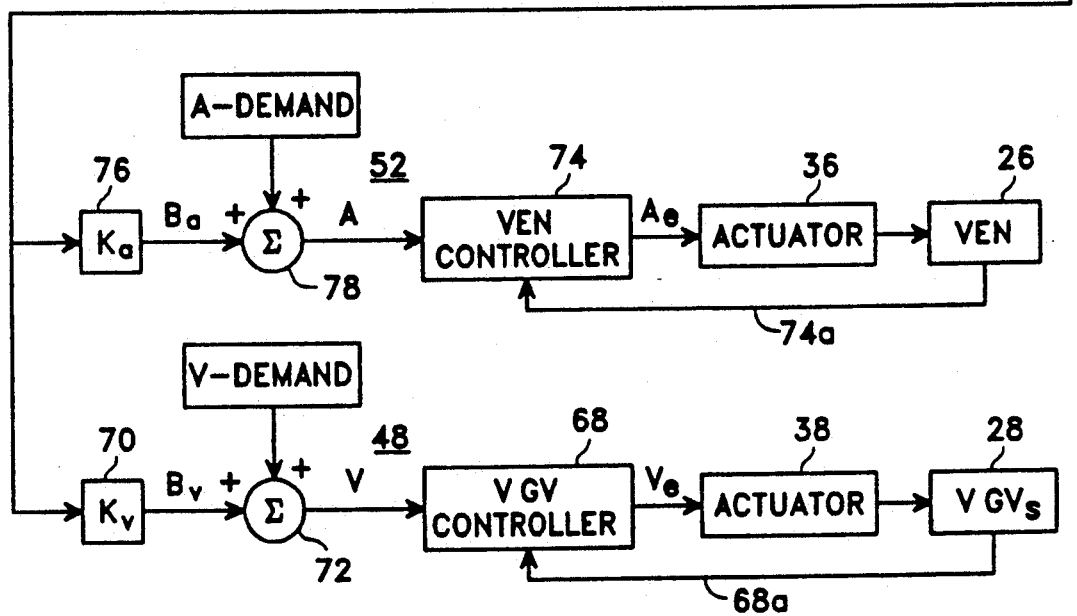
FIG. 8 is a graph plotting a bias signal (B) versus fan speed deceleration.
Figure 8:
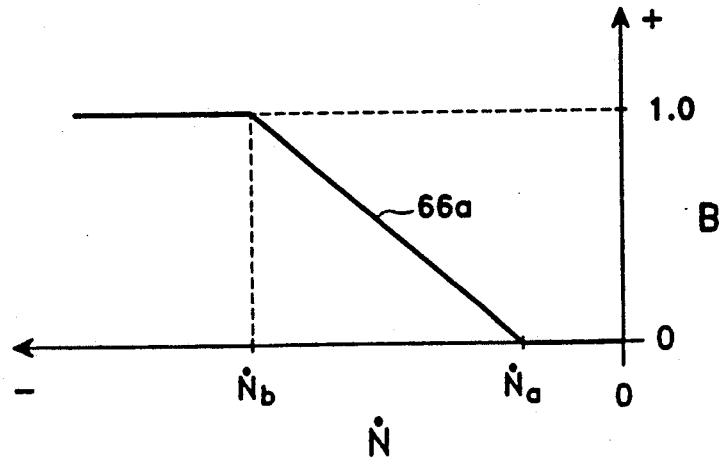

More specifically, FIG. 8 is a graph plotting the magnitude of the bias signal B on the ordinate versus the magnitude of the rate of change of the fan speed $\dot{N}$ on the abscissa as represented by a "turning on"-portion 66a of the bias B-curve 66 which is also shown relative to time in the B-curve 66 illustrated in FIG. 7. The bias schedule 64 is conventionally effective to vary the on-portion 66a of the bias signal B as a function of the rate of change of the fan speed $\dot{N}$ between the zero and maximum values from the first to second times $T_a$ and $T_b$, respectively, preferably in proportion to the rate of change of the fan speed $\dot{N}$ varying from the first to second values thereof, i.e. $\dot{N}_a$ to $\dot{N}_b$, respectively. Referring also to FIG. 4, the second value of the fan speed rate of change $\dot{N}_b$ in absolute value is greater than the first value $\dot{N}_a$ and less than the maximum deceleration $\dot{N}_m$, or, alternatively, $\dot{N}_b$ is less than $\dot{N}_a$ (more negative) and greater than $\dot{N}_m$ (less negative). The B-curve on-portion 66a, accordingly, occurs in time between $\dot{N}$ having an initial value of zero and before $\dot{N}$ reaches its maximum deceleration $\dot{N}_m$ to ensure that the bias signal B is promptly generated and reaches its maximum value for being effective for preventing significant reduction in stall margin of the fan. In the preferred embodiment of the invention, the bias schedule 64 is effective to vary the bias signal B linearly between the first and second fan speed rate of change values $\dot{N}_a$ and $\dot{N}_b$ as shown in FIG. 8 for obtaining stable dynamic response of the control subsystems 48 and 52. In alternate embodiments of the invention, the bias signal B may be non-linearly varied between $\dot{N}_a$ and $\dot{N}_b$ as required for particular design applications.

Once the bias signal B is turned on and reaches its maximum value of 1.0, for example. as shown in FIG. 7, it remains on for improving fan stall margin until the fan deceleration event has substantially expired, with the fan speed N nearing steady state at its reduced second value $N_2$ as illustrated in FIG. 3. Accordingly, at a suitable third time $T_c$ greater than, or after, the second time $T_b$, the bias schedule 64 illustrated in FIG. 7 is effective to vary the bias signal B between the maximum value of 1.0 and the zero value over a predetermined time from the third time $T_c$ to a fourth time $T_d$ greater than, or after, the third time $T_c$. In one embodiment, the bias schedule 64 is effective to vary the bias signal B linearly between the third and fourth times $T_c$ and $T_d$ to provide a "turning off"-portion 66b of the B-curve 66 for turning off the bias signal B when no longer needed during the fan deceleration event. After the fourth time $T_d$, the bias signal B has a value of zero until the next need for activating the bias signal B in another fan deceleration event. As shown in FIG. 4, the third time $T_c$ at which the B-curve off-portion 66b commences in this exemplary embodiment is that time at which the $\dot{N}$-curve 44 reaches an absolute magnitude less than all of the magnitudes associated with $\dot{N}_a$, $\dot{N}_b$, and $\dot{N}_m$, or, in other words, when $\dot{N}_c$ is less negative or greater than these values and suitably approaches zero, with the particular value thereof being determined analytically or empirically for each design application as that value at which biasing of the fan stall margin is no longer required. For example, the third time may be any suitable time after that associated with $\dot{N}_m$.

In a preferred embodiment as shown in FIG. 7, the off-portion 66b is delayed for a predetermined hold time $T_h$ after reaching $\dot{N}_c$ to maintain the maximum bias signal B for a short time as desired. For example, the hold time $T_h$ may be used where the value of $\dot{N}$ may be affected by signal noise. Or, a suitable hold time $T_h$ of about one second, for example, may be used for the possibility of a throttle reburst which reaccelerates the fan. The hold time $T_h$ may have any suitable value from zero and up as required for particular design applications, with the off-portion 66b then following the hold time $T_h$ all within the region of time from $T_c$ to $T_d$.

Accordingly, the bias signal B increases to its maximum value from its initial zero value upon initial deceleration of the fan 14 prior to reaching the maximum deceleration value $\dot{N}_m$ as illustrated in FIGS. 4 and 7, and then remains at its maximum value until the fan deceleration decreases to the suitably low value of $\dot{N}_c$ at which the bias signal B is suitably decreased to its zero value. The bias signal B is, therefore, introduced solely during the transient event based on fan deceleration and is removed upon reaching steady state operation wherein it is no longer required.

Referring again to FIG. 7, the bias signal B is provided to at least one, and preferably both of the control subsystems 48 and 52. For example, the bias signal B is provided to the vane control subsystem 48 to additionally close the vanes 28 at the bias signal maximum value for increasing stall margin of the fan 14 during deceleration of the fan 14. More specifically, the vane control system 48 illustrated in FIG. 7 conventionally includes a VGV controller 68 conventionally joined to the VGV actuator 38 for providing the vane error signal $V_e$ thereto for positioning the VGVs 28, and receives a position feedback signal from the VGVs 28 through a conventional feedback loop 68a. The normal scheduling of the VGV controller 68 uses a conventional V-demand signal as shown in FIG. 7 which is obtained from the unbiased V-curve 50 illustrated in FIG. 5 in solid line and provided to the VGV controller 68 as the vane position signal V. In order to additionally close the vanes 28 for increasing stall margin during the fan deceleration event, the bias signal B is conventionally scaled by a suitable factor $K_v$ in a conventional scaling means 70 with the scaled bias signal $B_v$ being added to the conventional V-demand represented by the V-curve 50 illustrated in FIG. 5 in a conventional summer 72. The vane position signal V provided to the VGV controller 68 for positioning the vanes 28 is therefore biased during the throttle chop and follows the $V_b$ curve values illustrated in FIG. 5 in dashed line labeled $V_b$. The biased vane demand signal $V_b$ is superimposed over the V-curve 50 to illustrate the effect of the bias signal B from the bias schedule 64 on the vanes 28 which provides additional or earlier closure thereof over that represented by the normal V-curve 50 which is used for transiently increasing fan stall margin to reduce the pinch point region which would otherwise occur for this exemplary engine 10.

Similarly, the bias signal B from the bias schedule 64 is also provided to the VEN control subsystem 52 to additionally open the VEN 26 to further increase the discharge area A at the bias signal maximum value for increasing stall margin of the fan 14 during deceleration thereof. The VEN control subsystem 52 similarly includes a conventional VEN controller 74 which normally receives the area A-demand signal represented by the solid A-curve 56 of FIG. 6. The VEN controller 74 is conventionally joined to the VEN actuator 36 for providing the area signal A thereto for positioning the VEN 26, and receives a position feedback signal from the VEN 26 through a conventional feedback loop 74a. In accordance with the present invention, the bias signal B is provided from the bias schedule 64 and is scaled by a suitable scale factor $K_a$ in another conventional scaling means 76 to generate a scaled bias signal $B_a$ for the vane control subsystem 48. The scaled bias signal $B_a$ is added to the A-demand signal in another conventional summer 78 for generating a biased area demand signal $A_b$ which is provided to the VEN controller 74 as the VEN area signal A. The biased area demand signal $A_b$ is shown in FIG. 6 in dashed line superimposed over the A-curve 56 to illustrate the additional opening, or delayed closing, of the discharge area A of the VEN 26 due to the introduction of the bias signal B from the bias schedule 64 during the transient fan deceleration event.

Accordingly, the bias signal B from the bias schedule 64 may be suitably scaled and used in one or both of the control subsystems 48 and 52 for reducing the pinch point region in fan stall margin in the fan operating map for increasing stall margin during this specific, transient fan deceleration event, while permitting unbiased, normal operation of the VEN 26 and the VGVs 28 during normal and steady state operation not meeting the requirements of the bias schedule 64. Although the bias signals $B_a$ and $B_v$ are shown schematically as being added to the conventional A and V demand signals in the subsystems 48 and 52, they may be otherwise conventionally incorporated therein, for example by being multipliers of the A and V demand signals for suitably transiently scaling the values thereof to effect the desired operating curves illustrated in FIGS. 5 and 6.

The bias signals $B_a$ and $B_v$ may also be integrated into the control subsystems 48 and 52 with conventional maximum or minimum select devices to ensure that their effect does not exceed suitable maximum or minimum values effected by any other signals incorporated in these subsystems such as, for example, an altitude bias signal which is used to additionally open the VEN 26 at certain altitudes. In such event, if the effective bias of the signal $B_a$ requires additional opening of the VEN 26 beyond that required by the altitude bias signal, such additional opening would be limited to the maximum amount effected by the altitude bias signal. Of course, the scaled bias signals $B_a$ and $B_v$ may be incorporated into the control subsystems 48 and 52 in various manners to provide a correcting effect where desired for improving fan stall margin over that which would otherwise occur without such corrections.

In the preferred embodiments described above, the operating parameter used is the fan speed N, along with its derivative Ṅ, which provides a suitable parameter for generating the bias signal B to improve fan stall margin. However, other operating parameters could be used instead such as the conventionally known fan discharge pressure, or fan inlet temperature, or angles of attack and sideslip of the aircraft being powered by the engine 10 which are all conventionally known to affect fan stall margin. The time derivative of these operating parameters may be used similarly to Ṅ for controlling the turning on and off of the bias signal B. The invention may be used also for improving stall margin of the compressor 16 similarly using its rotor speed and time derivative thereof in the same manner as described above with respect to the fan 14. Besides being applicable to improving stall margin, the invention may also be applied to increase the margins associated with rumble or flameout of the main combustor, or screech rumble of the afterburner wherein suitable operating parameters and time derivatives thereof can be identified for introducing bias signals into the respective control subsystems for these engine components.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is claimed and desired to be secured by Letters Patent of the United States is the invention as defined and differentiated in the following claims:

1. For a gas turbine engine having a compressor powered by a high pressure turbine (HPT) and a fan powered by a low pressure turbine (LPT), a control system for biasing a control subsystem of said engine comprising:
   means for measuring an operating parameter of said engine;
   means for differentiating said parameter over time to obtain a derivative of said parameter indicative of rate of change of said parameter;
   means for generating a bias signal in response to said parameter derivative, said bias signal having:
      a value of zero for values of said parameter derivative from zero to a first value thereof at a first time;
      a maximum value for values of said parameter derivative between second and third values thereof corresponding with second and third times, said second time being after said first time, and said third time being after said second time; and
      a value of zero after a fourth time greater than said third time; and means for providing said bias signal to said subsystem for biasing said subsystem.

2. A method of biasing a control subsystem of a gas turbine engine having a compressor powered by a high pressure turbine (HPT) and a fan powered by a low pressure turbine (LPT) comprising the steps of:
   measuring an operating parameter of said engine;
   differentiating said parameter over time to obtain a derivative of said parameter indicative of rate of change of said parameter;
   generating a bias signal in a predetermined bias schedule in response to said parameter derivative, said bias signal having:
      a value of zero for values of said parameter derivative from zero to a first value thereof at a first time;
      a maximum value for values of said parameter derivative between second and third values thereof corresponding with second and third times, said second time being after said first time, and said third time being after said second time; and
      a value of zero after a fourth time greater than said third time; and providing said bias signal to said subsystem for biasing said subsystem.

3. A method according to claim 2 wherein said bias schedule is effective to vary said bias signal between said zero and maximum values from said first to second times in proportion to said parameter derivative varying from said first to second values thereof.

4. A method according to claim 3 wherein said bias schedule is effective to vary said bias signal linearly between said parameter derivative first and second values.

5. A method according to claim 3 wherein said bias schedule is effective to vary said bias signal between said maximum and zero values from said third to said fourth times in proportion to time.

6. A method according to claim 5 wherein said bias schedule is effective to vary said bias signal linearly between said third and fourth times.

7. A method according to claim 3 wherein:
   said engine further includes variable vanes for varying inlet flow of air to said fan;
   said control subsystem is a vane control subsystem for selectively opening and closing said vanes for increasing and decreasing, respectively, said inlet airflow through said fan in accordance with a predetermined vane schedule; and
   said bias signal is provided to said vane control subsystem to additionally close said vanes at said bias signal maximum value for increasing stall margin of said fan during deceleration thereof.

8. A method according to claim 3 wherein:
   said engine further includes a variable area exhaust nozzle (VEN) for varying discharge area of exhaust gases discharged from said engine;
   said control subsystem is a VEN control subsystem for selectively opening and closing said VEN for increasing and decreasing, respectively, said discharge area in accordance with a predetermined VEN schedule; and
   said bias signal is provided to said VEN control subsystem to additionally open said discharge area at said bias signal maximum value for increasing stall margin of said fan during deceleration thereof.

9. A method according to claim 8 wherein:
   said engine further includes variables vanes for varying inlet flow of air to said fan;
   said control subsystem includes a second control subsystem in the form of a vane control subsystem for selectively opening and closing said vanes for increasing and decreasing, respectively, said inlet airflow through said fan in accordance with a predetermined vane schedule; and
   said bias signal is provided also to said vane control subsystem to additionally close said vanes at said bias signal maximum value for increasing stall margin of said fan during deceleration of said fan.

10. A method according to claim 9 wherein said operating parameter is speed of said fan.

* * * * *